United States Patent
Darby et al.

(10) Patent No.: US 12,553,504 B2
(45) Date of Patent: Feb. 17, 2026

(54) STRAIN WAVE DRIVE

(71) Applicant: Goodrich Actuation Systems Limited, Solihull (GB)

(72) Inventors: Jonathan Darby, Newcastle (GB); Paweł Chmielewski, Jelenia Góra (PL); Stephen Davies, Shrewsbury (GB); Katarzyna Łuszczyk, Wrocław (PL); Marcin Cis, Lutynia (PL); Łukasz Turek, Wrocław (PL)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 18/665,760

(22) Filed: May 16, 2024

(65) Prior Publication Data
US 2024/0392867 A1 Nov. 28, 2024

(30) Foreign Application Priority Data
May 26, 2023 (EP) .................................. 23461598

(51) Int. Cl.
*F16H 49/00* (2006.01)
*B64C 13/28* (2006.01)

(52) U.S. Cl.
CPC ........... *F16H 49/001* (2013.01); *B64C 13/28* (2013.01)

(58) Field of Classification Search
CPC ............................... F16H 49/001; B64C 13/28
See application file for complete search history.

(56) References Cited

U.S. PATENT DOCUMENTS

| | | | |
|---|---|---|---|
| 3,435,705 | A | 4/1969 | Musser |
| 8,020,470 | B2 | 9/2011 | Saito |
| 8,302,507 | B2 | 11/2012 | Kanai |

(Continued)

FOREIGN PATENT DOCUMENTS

| | | |
|---|---|---|
| CN | 109578551 B | 8/2020 |
| CN | 112431908 A | 3/2021 |
| CN | 112483625 A | 3/2021 |

(Continued)

OTHER PUBLICATIONS

Abstract for EP4080088 (A1), Published: Oct. 26, 2022, 1 page.

(Continued)

*Primary Examiner* — Terence Boes
(74) *Attorney, Agent, or Firm* — CANTOR COLBURN LLP

(57) ABSTRACT

A strain wave drive includes: an elliptical wave generator shaft rotatable about an axis (X); a flexible flex spline mounted around the wave generator shaft; a ring gear assembly mounted around the flex spline, the ring gear assembly comprising an output ring gear having a circular inner periphery and being sandwiched between two earth ring gears each having a circular inner periphery. The flex spline has a first set of a first number of radially outwardly extending teeth around its outer periphery. Each earth ring gear has the first number of radially inwardly extending teeth to engage with the first set of teeth of the flex spline. The flex spline has a second set of the first number of radially outwardly extending teeth around its outer periphery wherein the output ring gear has a second number of radially inwardly extending teeth.

12 Claims, 2 Drawing Sheets

(56) References Cited

U.S. PATENT DOCUMENTS

| | | |
|---|---|---|
| 11,198,181 B2 | 12/2021 | Hofmann et al. |
| 2024/0209929 A1* | 6/2024 | Chmielewski ........ F16H 49/001 |

FOREIGN PATENT DOCUMENTS

| | | |
|---|---|---|
| DE | 102012109774 A1 | 5/2014 |
| DE | 102016116438 B3 | 1/2018 |
| DE | 102019117853 A1 | 1/2020 |
| EP | 4080088 A1 | 10/2022 |
| JP | 2019157891 A | 9/2019 |
| WO | 2007115510 A1 | 10/2007 |

OTHER PUBLICATIONS

Abstract for DE102016116438 (B3), Published: Jan. 18, 2018, 1 page.
Abstract of CN109578551 (B), Published: Aug. 21, 2020, 1 page.
Abstract of CN112431908 (A), Published: Mar. 2, 2021, 1 page.
Abstract of CN112483625 (A), Published: Mar. 12, 2021, 1 page.
Abstract of DE102012109774 (A1), Published: May 15, 2014, 1 page.
Abstract of DE102019117853 (A1), Published: Jan. 30, 2020, 1 page.
Abstract of JP2019157891 (A), Published: Sep. 19, 2019, 1 page.
European Search Report for Application No. 23461598.7, mailed Oct. 19, 2023, 12 pages.

* cited by examiner

STRAIN WAVE DRIVE

CROSS REFERENCE TO RELATED APPLICATIONS

This application claims priority to European Patent Application No. 23461598.7 filed May 26, 2023, the entire contents of which is incorporated herein by reference.

TECHNICAL FIELD

The present disclosure relates to a strain wave drive particularly a strain wave drive for rotary actuation of flight control surfaces of an aircraft.

BACKGROUND

Rotary actuation of devices or surfaces e.g. flight control surfaces in an aircraft, requires high torque drive and so typically requires gearing between the electric motor, which is typically high speed, low torque, and the output shaft of the actuator that drives the surface. Conventional involute gears, comprising a number of intermeshing toothed wheels to create the required gear ratio, are relatively large and heavy and the higher the required ratio, the more gears and, thus, the greater the size and weight of the overall actuator system.

In aircraft in particular, and also in other applications, there is a need to minimise the size and weight of components and there is a desire to provide a gear or drive that can provide the required torque ratio using a smaller, lighter, more compact arrangement.

A known type of gear mechanism that is particularly compact is the strain wave drive or gear. Strain wave gearing, also known as a harmonic drive, is used in many drive trains as it is compact and lightweight and can be used to provide a high gear ratio between an input or drive shaft and an output shaft. These properties make strain wave gearing suited to use in aircraft and other vehicles where space is limited and weight of components should be minimised, whilst maintaining reliability and performance.

A strain wave gear system includes a wave generator which is in the form of an elliptical shaft and a compliant ball bearing in which the elliptical shaft rotates. A flexible toothed ring (a flex spline) is mounted about the wave generator and engages, and conforms to the shape of, the output shaft. A fixed outer ring, or circular spline is provided around the flex spline and has inner teeth that engage with the outer teeth of the flex spline but, due to the elliptical shape of the wave generator, the flex spline only engages with the teeth of the outer ring at the major diameter of the wave generator.

In operation, a drive shaft, connected to the wave generator, is rotated e.g. by a motor, which causes rotation of the wave generator. The bearing conforms to the elliptical shape of the wave generator. The flex spline conforms to the shape of the drive shaft and so as the wave generator rotates, the flex spline will only engage with the inner teeth of the outer ring at the major axes of the ellipse. The circular spline has a different number of inner teeth to the number of outer teeth of the flex spline. Rotation of the drive shaft thus causes a slower rotation of the output shaft by its engagement with the flex spline. The output shaft is connected to the device or surface to be moved by the actuator.

Known strain wave drives, however, have to be designed with built-in compliance (as discussed below) to ensure correct load distribution and engagement of the teeth. This adds to the costs and complexity of such gears for use in e.g. flight control rotary actuation. There is, therefore, a desire for an improved strain wave drive that retains the benefits of compactness and light weight whilst overcoming problems associated with existing strain wave drives.

SUMMARY

According to the disclosure, there is provided a strain wave drive comprising: an elliptical wave generator shaft rotatable about an axis (X); a flexible flex spline mounted around the wave generator shaft; a ring gear assembly mounted around the flex spline, the ring gear assembly comprising an output ring gear having a circular inner periphery and being sandwiched between two earth ring gears each having a circular inner periphery; wherein the flex spline has a first set of a first number of radially outwardly extending teeth around its outer periphery; and wherein each earth ring gear has the first number of radially inwardly extending teeth to engage with the first set of teeth of the flex spline; and wherein the flex spline has a second set of the first number of radially outwardly extending teeth around its outer periphery wherein the output ring gear has a second number of radially inwardly extending teeth, such that as the wave generator shaft rotates, it causes the flex spline to take up the elliptical form of the wave generator shaft and the teeth of the flex spline engage with second set of teeth of the output ring gear at the major diameter of the ellipse, causing the output ring gear to rotate; and wherein the wave generator shaft is provided with a radially outer surface defining the elliptical shape and arranged to engage with an inner surface of the flex spline; the strain wave drive further comprising roller bearing supports provided between the cam surface and the flex spline, and wherein the roller bearing supports are formed with a longitudinal barrel shape and/or the teeth of the flex spline define a longitudinal barrel profile, to define a convex curved surface at the interface between the bearings and the flex spline.

BRIEF DESCRIPTION

Examples of the strain wave drive according to the disclosure will now be described with reference to the drawings. It should be noted that these are examples only and variations are possible within the scope of the claims.

DETAILED DESCRIPTION

Figure 1A:
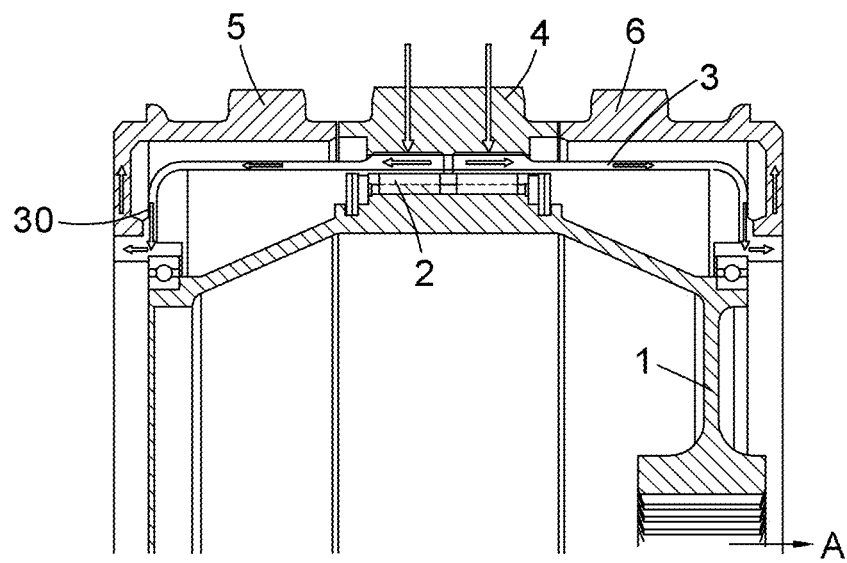
FIG. 1A shows a cross-section through a known type of strain wave drive.

As mentioned above, conventional drives for moving e.g. flight control surfaces in aircraft, have used a series of inter-meshing gear wheels. In an attempt to reduce the overall size and weight of the gearing, thought has been given to the use of the more compact strain wave gears or drives (also known as harmonic drives). Such strain wave drives essentially consist of three main parts: a wave generator, driven by the motor drive shaft, is an elliptical shaft having bearings arranged around the outer perimeter thereof. The wave generator is located within a cylindrical flex spline which is a flexible annular component having radially outwardly extending teeth. The flex spline is sufficiently flexible to take up the elliptical shape of the wave generator as the wave generator and its bearings rotate within the flex spline. A rigid circular spline is a ring that fits around the flex spline. The circular spline has inwardly extending teeth. The circular spline is typically fixed e.g. to the actuator housing. As the wave generator is rotated by the motor, it causes the flex spline to take up the elliptical shape such that the outwardly extending teeth of the flex spline mesh with the inwardly extending teeth of the circular spline at the locations of the major axis of the ellipse. The circular spline typically has more teeth than the flex spline such that as the teeth engage, the flex spline is caused to rotate relative to the circular spline at a rate of rotation different to that of the motor. In other applications, such as shown in FIG. 1A, an output ring gear is positioned around the flex spline. The output ring gear is provided with inner teeth that engage with the teeth of the flex spline. As the flex spline deforms due to rotation of the wave generator inside it, its teeth engage with the inwardly protruding teeth of the output ring and, due to the elliptical movement of the point of engagement, this causes the output ring gear to rotate according to the gear ratio. The output ring gear is connected with a part or component to be moved by the drive.

Figure 1B:
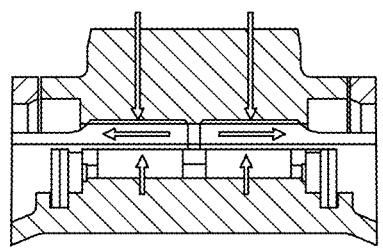
FIG. 1B shows a detail of the strain wave drive of FIG. 1A.

Current designs of strain wave drives for rotary actuation of flight control surfaces require a right-angled U-shaped or cup-shaped flex spline to provide the flex spline function within the available space envelope and with the required strength and stress resistance. The right-angle cup shape adds stiffness and distributes stress through the earthed parts of the system. An example of such a strain wave drive is shown in FIGS. 1A and 1B. Because the flex spline is cup-shaped, it has to be formed as two cup parts for manufacturing and assembly purposes, the two cup parts meeting at a join aligned with the output ring gear sandwiched between the earth gears.

FIG. 1A shows a section of the strain wave drive, showing the wave generator 1, rotatable about axis A. Needle bearings 2 are provided around the perimeter of the wave generator 1. The flex spline 3 is fitted around the wave generator to engage with the bearings to take up the elliptical shape of the wave generator. In the example shown, two flex splines are provided, each formed with a flange 30. Teeth (not shown in this figure) on the outer surface of the flex spline engage, at certain positions of rotation, with inwardly extending teeth (not shown in this figure) of the output ring gear 4. The earth gears may be fixed relative to the actuator housing or other fixed component and the flex spline may engage with an output shaft or output ring gear 4 which is caused to rotate with rotation of the point of engagement with the flex spline as the wave generator rotates. The output gear rotates according to the gear ratio and may be fixed to a part or surface to be rotated e.g. a flight control surface.

Figure 2:
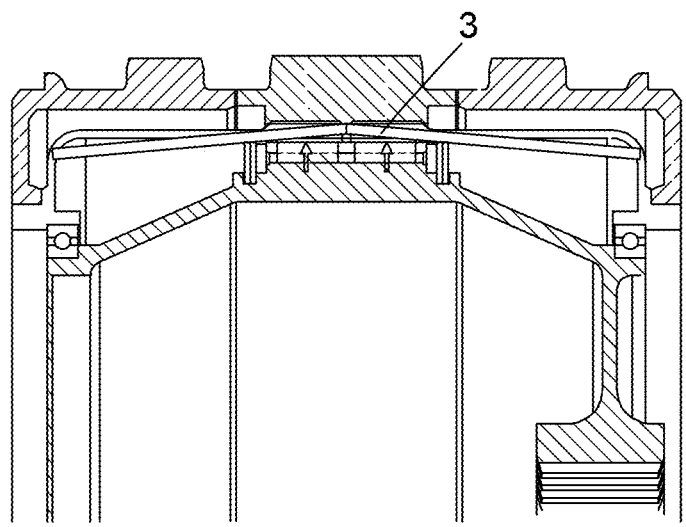
FIG. 2 shows a strain wave drive such as shown in FIGS. 1A and 1B during deflection of the flex spline.

Because there is uneven loading on the flex spline 3 between the wave generator, via the bearings, and the output gear, and equal loads are transmitted from the flex spline through the earth gears, as the flex spline deforms to the shape of the bearings, it creates a 'coning' effect as shown in FIG. 2. The split, two-part flex spline forms a conical shape at its interface with the output gear and the earth gears which can cause an uneven interference between the intermeshing teeth at some positions, i.e. when the flex spline deflects, it engages with the corresponding teeth at an angle. This angle may also vary under changing loads and temperatures.

To take into account the tilt between the meshing gears when the flex spline is deformed, compliance needs to be built into the design to ensure uniform load distribution from the parts that generate the motion of the gearing through to the flex spline itself. This has conventionally been done by adding additional components to provide the required compliance. These components, however, add to the cost, complexity, size and weight of the drive.

Figure 3:
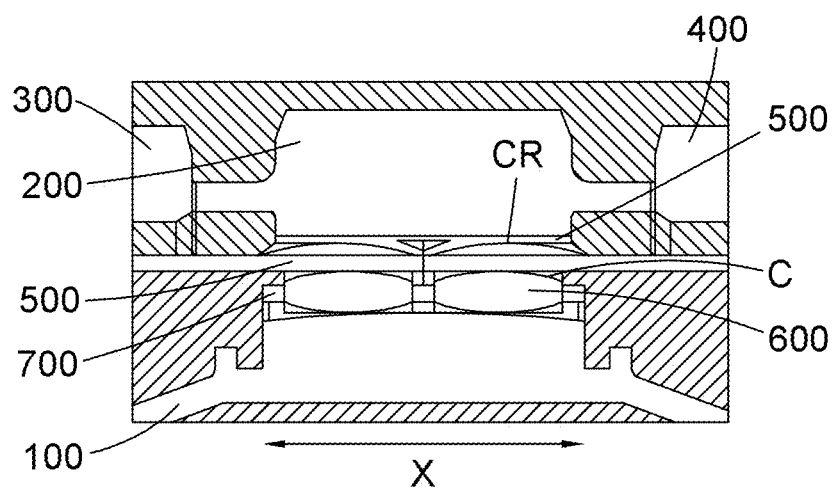
FIG. 3 shows an example of a strain wave drive in accordance with the present disclosure.

To address these problems, the strain wave drive of this disclosure incorporates compliance into the drive by modifying the shape of the bearing rollers and/or the longitudinal profile of the flex spline teeth. One example of this can be seen in FIG. 3 where C represents the curved profile of the bearings. The bearings are formed with a barrel shape or a longitudinal convex surface shape as opposed to providing a straight or flat surface interface between the bearing and the flex spline as is conventionally the case. The compliance in the shaping of the bearing rollers allows the flex spline to follow the barrel curve in the longitudinal direction. In addition, or alternatively, the teeth of the flex spline may define a similar longitudinal 'barrel' profile which results in a longitudinal tooth profile curvature (or 'crowning'). The flex spline can, therefore, mesh efficiently at its maximum tilt angle with the outer spline, without the teeth interference due to coning as described above. Instead, a more uniform contact loading will be transferred through to the output circular splines. This uniform loading ensures that the coning effect is compensated.

The elliptical wave generator 100 is a shaft, rotatable about an axis X, and located within the flex spline 500 which is a cup-shaped component. Mounted around the flex spline is the output ring gear 200 between the earth gears 300, 400. The flex spline 500 takes the elliptical shape of the wave generator and therefore engages with the teeth on the output gear 200 at the points of the ellipse major axis. Because the output gear has two more teeth than the flex spline, there is relative movement in the rotational direction between the flex spline and the output gear.

The output ring gear 200 has two teeth more that the flex spline 500 and this provides the gear ratio.

The bearings, here needle rollers 600, are fitted around the wave generator 100 on a cage of bearing support rollers 700. The bearings 600 rotate with the wave generator 100 and impart the elliptical shape of the wave generator to the flex spline 500. As the elliptical wave generator rotates, the outer sections of the flex spline are secured by the earth gears and, at the major diameter of the ellipse, the middle section of the flex spline is deformed to take up the elliptical shape and its teeth, in that section, mesh with the teeth of the output gear causing it to rotate.

The curved surface C of the bearings 600, or the profile of the flex spline teeth, is, as mentioned above, formed with a curved or barrel profile to provide the required compliance to the flex spline to compensate for coning. The contact between the bearings and the flex spline causes the flex spline to adapt to the curved shape C of the bearing rollers. The curvature or 'crowning' allows for several degrees of self-alignment of the bearings and flex spline, which adds further compliance to the design.

Because of the shape of the bearings and/or the profile of the teeth, the strain wave drive has a compliant design that provides uniform stress distribution loading. The bearing/teeth profile may be precision machined. Because the curvature of the bearings/teeth profile results in a reduced edge/point contact, there is reduced drag and wear on the flex spline and a higher load capability. The design is simple to manufacture and assemble.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is not intended that the present disclosure be limited to the particular embodiment disclosed as the best mode contemplated for carrying out this present disclosure, but that the present disclosure will include all embodiments falling within the scope of the claims.

The invention claimed is:

1. A strain wave drive comprising:
   an elliptical wave generator shaft rotatable about an axis (X);
   a flexible flex spline mounted around the wave generator shaft; and
   a ring gear assembly mounted around the flex spline, the ring gear assembly comprising an output ring gear having a circular inner periphery and being sandwiched between two earth ring gears each having a circular inner periphery;
   wherein the flex spline has a first set of a first number of radially outwardly extending teeth around its outer periphery; and
   wherein each earth ring gear engages with the first set of teeth of the flex spline; and
   wherein the flex spline has a second set of the first number of radially outwardly extending teeth around its outer periphery
   wherein the output ring gear has a second number of radially inwardly extending teeth,
   such that:
   as the wave generator shaft rotates, it causes the flex spline to take up an elliptical shape of the wave generator shaft; and
   the teeth of the flex spline engage with second set of teeth of the output ring gear at a major diameter of the elliptical shape, causing the output ring gear to rotate,
   wherein the wave generator shaft is provided with a radially outer surface defining the elliptical shape and arranged to engage with an inner surface of the flex spline;
   the strain wave drive further comprising:
   roller bearings that engage the flex spline, and
   wherein:
   the teeth of the flex spline define a longitudinal barrel profile,
   to define a convex curved surface at the interface between the ring gear and the flexspline.

2. The strain wave drive of claim 1, wherein the second set of teeth of the flex spline define a longitudinal barrel profile.

3. The strain wave drive of claim 1, wherein the bearings are needle roller bearings.

4. The strain wave drive of claim 1, wherein the second number is greater than the first number.

5. The strain wave drive of claim 4, wherein the second number is two more than the first number.

6. The strain wave drive of claim 4, wherein the second number is three more than the first number.

7. The strain wave of claim 1, wherein the earth ring gears are configured to be attached to an external fixed part.

8. The strain wave drive of claim 7, wherein the earth ring gears are provided with attachment flanges for attachment to the external fixed part.

9. The strain wave drive of claim 1, wherein the output ring gear is configured to be attached to a part or component to be moved.

10. The strain wave drive of claim 1, wherein the flex spline is formed as two cup-shaped parts adjoined at their open ends.

11. The strain wave drive of claim 1 in combination with a moveable part or component of an aircraft for moving a moveable part or component of an aircraft and arranged to move the moving a moveable part or component.

12. The strain wave drive of claim 1, in combination with a flight control surface of an aircraft and arranged to move the flight control surface.

* * * * *